United States Patent
Pfeiffer et al.

(10) Patent No.: US 10,916,076 B2
(45) Date of Patent: Feb. 9, 2021

(54) METHOD AND APPARATUS FOR ADAPTIVE VEHICLE ROUTE-RELATED DATA GATHERING

(71) Applicant: FORD GLOBAL TECHNOLOGIES, LLC, Dearborn, MI (US)

(72) Inventors: John Jeffrey Pfeiffer, Saline, MI (US); Michael Lambert, Ann Arbor, MI (US); Surya Sagiraju, Belleville, MI (US); John Michael Fischer, Brighton, MI (US); Harold Bernard Samuels, Farmington, MI (US); Adam Pagryzinski, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 589 days.

(21) Appl. No.: 15/496,703

(22) Filed: Apr. 25, 2017

(65) Prior Publication Data

US 2018/0308299 A1 Oct. 25, 2018

(51) Int. Cl.
| | | |
|---|---|---|
| *G07C 5/08* | (2006.01) | |
| *G01C 21/36* | (2006.01) | |
| *B60W 30/12* | (2020.01) | |
| *G01S 19/42* | (2010.01) | |
| *A63K 3/00* | (2006.01) | |
| *G01S 19/39* | (2010.01) | |

(52) U.S. Cl.
CPC ............. *G07C 5/0841* (2013.01); *A63K 3/00* (2013.01); *G01S 19/39* (2013.01); *G01S 19/42* (2013.01); *G01C 21/3626* (2013.01)

(58) Field of Classification Search
CPC .......... G07C 5/0841; G07C 5/08; A63K 3/00; G01S 19/42; G01C 21/3626; G01C 21/36; G01C 21/16; G01C 21/00; B60W 30/12; A47L 11/40; G08G 1/01; G01L 311/00
See application file for complete search history.

(56) References Cited

U.S. PATENT DOCUMENTS

| | | | | |
|---|---|---|---|---|
| 4,275,292 | A | | 6/1981 | Corbi |
| 4,958,306 | A | * | 9/1990 | Powell ............... G01C 7/04 702/40 |
| 5,941,934 | A | * | 8/1999 | Sato ............... G01C 21/30 701/446 |
| 2005/0075119 | A1 | * | 4/2005 | Sheha ............... G01C 21/26 455/456.6 |
| 2006/0176216 | A1 | * | 8/2006 | Hipskind ........... A63B 24/0021 342/357.57 |
| 2008/0189034 | A1 | * | 8/2008 | Sugiura ............... G01C 21/00 701/533 |

(Continued)

FOREIGN PATENT DOCUMENTS

| | | |
|---|---|---|
| CN | 203025536 U | 6/2013 |
| DE | 102009020997 A1 | 12/2009 |

*Primary Examiner* — Yuri Kan
(74) *Attorney, Agent, or Firm* — Michael Spenner; Brooks Kushman P.C.

(57) ABSTRACT

A system includes a processor configured to receive a track-creation request. The processor is also configured to initiate track recording, responsive to the request and record GPS points corresponding to vehicle movement. Further, the processor is configured to receive a track-completion instruction and store the recorded GPS points, and a line connecting the points, as representing a recorded track.

14 Claims, 6 Drawing Sheets

(56) References Cited

U.S. PATENT DOCUMENTS

| | | | |
|---|---|---|---|
| 2008/0306685 A1* | 12/2008 | Bernardini | G01C 21/00 701/431 |
| 2009/0119003 A1* | 5/2009 | Takeda | G01C 21/3626 701/532 |
| 2010/0057336 A1 | 3/2010 | Levine et al. | |
| 2012/0223842 A1* | 9/2012 | Schunder | G07C 5/085 340/936 |
| 2014/0051489 A1* | 2/2014 | Pierucci | A63F 13/803 463/6 |
| 2014/0190514 A1* | 7/2014 | Lamon | G05D 1/0219 134/6 |
| 2015/0198459 A1* | 7/2015 | MacNeille | G01C 21/3697 701/22 |
| 2017/0082453 A1* | 3/2017 | Fischer | G01C 21/3626 |
| 2017/0219360 A1* | 8/2017 | Cui | G01S 19/40 |
| 2017/0225681 A1* | 8/2017 | Motoyama | B60W 50/14 |
| 2017/0322031 A1* | 11/2017 | Eastman | G01C 21/165 |
| 2018/0059252 A1* | 3/2018 | Miura | G01C 21/30 |
| 2018/0190016 A1* | 7/2018 | Yang | G01C 21/32 |

\* cited by examiner

METHOD AND APPARATUS FOR ADAPTIVE VEHICLE ROUTE-RELATED DATA GATHERING

TECHNICAL FIELD

The illustrative embodiments generally relate to methods and apparatuses for adaptive vehicle route-related data gathering.

BACKGROUND

Many people are interested in owning performance vehicles. While these vehicles may not make up the bulk of automotive sales, the vehicles represent a clear and unique industry niche seeing regular yearly demand. While some people want to own the vehicles for their looks, most owners want to open the vehicles up at least one or twice, to really experience the performance that they paid for.

Even in the non-performance market, many people want to see how much power they can get out of their vehicle, or otherwise drive aggressively, on at least a limited basis, to see what their vehicle can accomplish. While individual performance can be tested virtually anywhere, it may be difficult to time and track performance, and it may be especially difficult to compare results of the performance with anyone else. Similarly, if a person ran a lap over a street-course and wanted to have a friend run the same lap, it would be difficult to share the lap directions beforehand and know afterwards if the same lap was run. Most people would have to visit a specialized race track to do any sort of comparative analysis.

SUMMARY

In a first illustrative embodiment, a system includes a processor configured to receive a track-creation request. The processor is also configured to initiate track recording, responsive to the request and record GPS points corresponding to vehicle movement. Further, the processor is configured to receive a track-completion instruction and store the recorded GPS points, and a line connecting the points, as representing a recorded track.

In a second illustrative embodiment, a system includes a vehicle-processor configured to receive a request for track selection. The processor is also configured to obtain a track from a remote server, based on parameters usable to identify the track, transmitted by the vehicle processor to the remote server. The processor is further configured to display the obtained track on a vehicle display and record and store vehicle performance data while the vehicle travels the displayed track In a third illustrative embodiment, system includes a processor configured to receive a drag-race start request. The processor is also configured to determine, responsive to a vehicle reaching a predetermined speed, a race-start as a point where the vehicle was last fully stopped and record vehicle speed and time-traveled from the race-start to a predetermined distance from the race-start.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
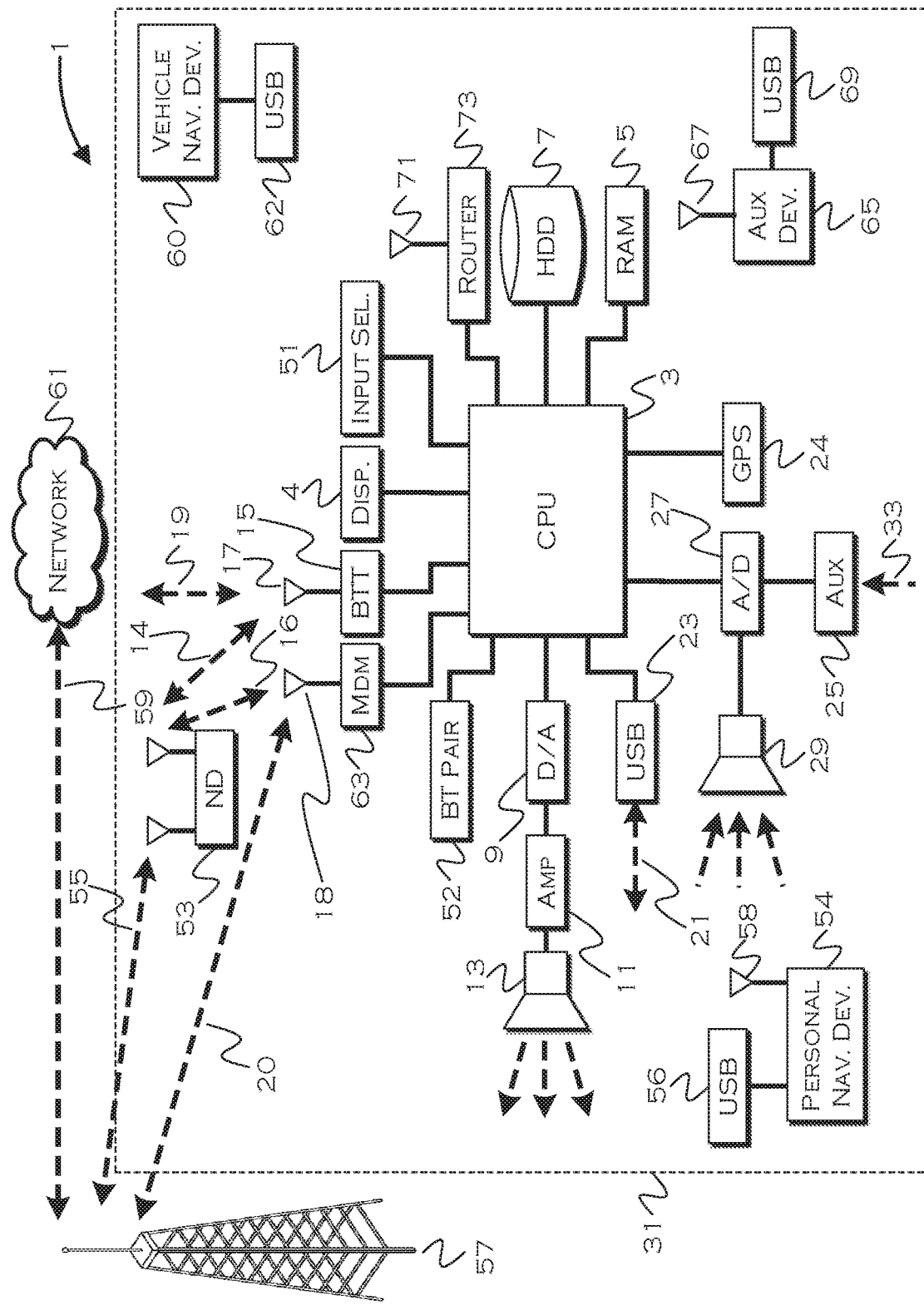
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments are presented with respect to aspects of a mobile and/or vehicular application that allows a user to record, track and view various aspects of a vehicle race. The race could be run on a street or track, the application allows the user to track and record race-related data regardless of the environment in which the user is operating.

While the illustrative processes are describe with respect to such an application, they may also have general vehicular applicability and are not always confined to applicability in a race-related setting. For example, without limitation, vehicle data, timing data, route data, track data and other recorded and playback-able data could all be recorded and viewed relating generally to any route or path, and this data could also be used to support other illustrative functionality, such as navigation improvements.

When a user wants to engage in a new race, either to compete against themselves or friends, there is not always a track available. Further, even if a track is available, a vehicle or other recording system may not have a record of the track available, and thus may have no way of knowing when a vehicle is starting, finishing and completing a lap.

The illustrative embodiments allow a user to dynamically create a track from scratch, by tracking the movement of a vehicle from a certain point until a finish line or the starting point is reached. The track, thus created, can be uploaded and shared with friends and others, as well as locally stored for later attempts.

This process allows the user to record a track and then to immediately use the track as a guide for tracking performance time. Having established a start and finish point, the process can track a lap, laps or a total race of a fixed number of laps. The user can share this data and the track with friends, who can travel to the designated and recorded track starting point and attempt to compete against the user based on the user's shared data statistics.

Figure 2:
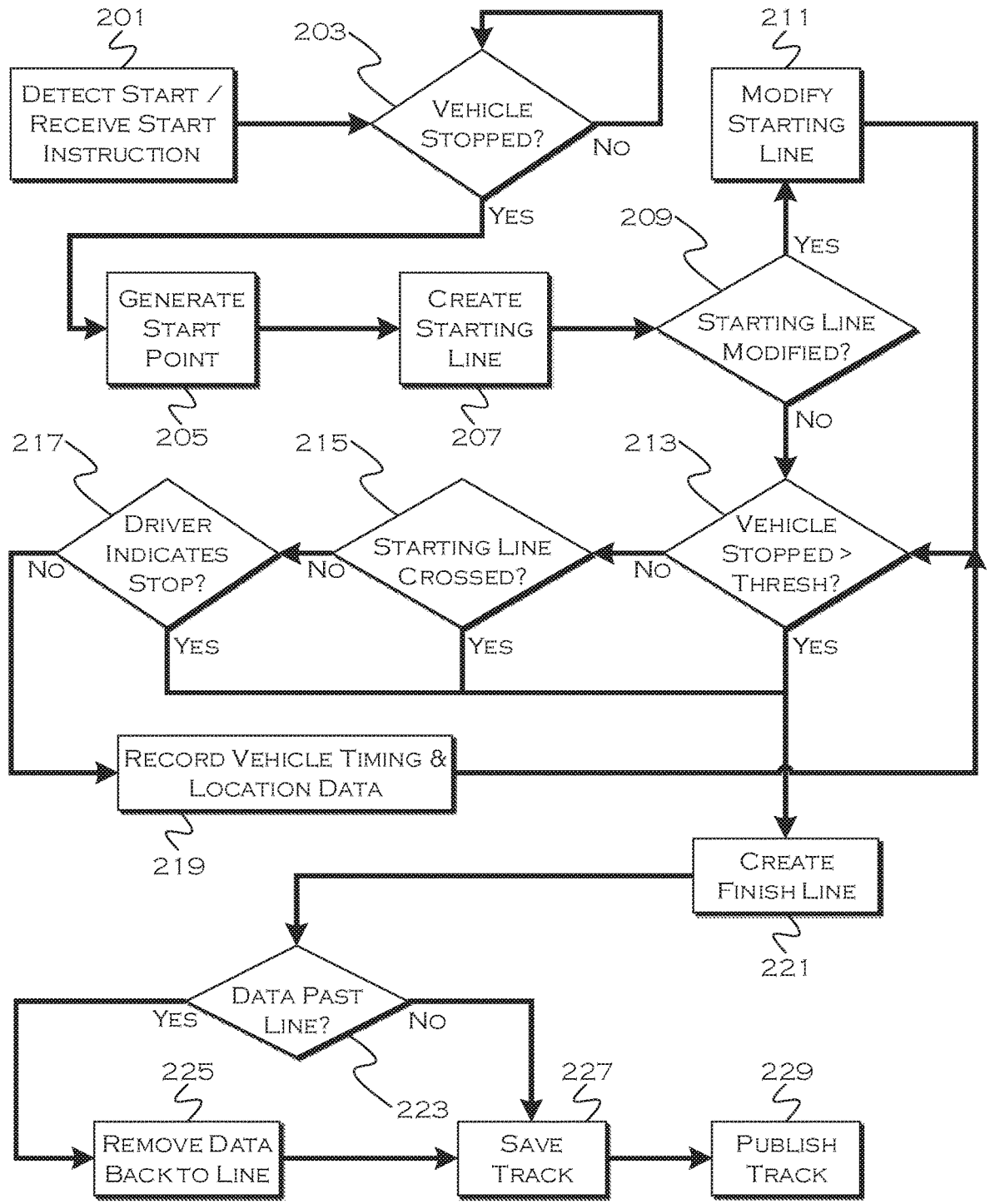
FIG. 2 shows an illustrative process for track detection and creation.

FIG. 2 shows an illustrative process for track detection and creation. In this example, the process will either detect 201 a start point or receive 201 race/track start point instructions. Since the user may want even the first lap of the track to be recorded, the process may determine 203 a vehicle stopping point recorded following a request to begin recording the track. If the user wants to maneuver up to a starting point, which may involve starting and stopping to get the vehicle exactly in position, the process may forego start point recordation until the vehicle achieves a certain speed (indicative of no longer maneuvering) and then back-determine the point as the point where the vehicle first began to move following a stop. It is also possible to simply begin recording when a button is pressed to record, without determining when/if/where a vehicle was stopped.

Using the appropriate data, depending on a setting or configuration for start point selection, the process may generate 205 a GPS start point based on the user location. Since most race tracks typically have a starting line as opposed to a starting point, the process may generate 207 a starting line, perpendicular to a vehicle heading at the start point. If the start point was on a known road, the line may be generated to be the width of the road and perpendicular to travel on the road (instead of heading, so as not to obtain an off-kilter line).

In this example, the user can modify the length and width of the starting line. This can be done, for example, by manually adjusting the line or otherwise entering a manipulation of the line data. If the user modifies 209 the starting line, the process records 211 the modified starting line.

In this example, once the recordation has begun, the process uses one of three factors to determine whether or not the track is completed. In this example, the process determines 213 if the vehicle has been stopped for more than a threshold time. In longer races, vehicles may need to "pit" for a repair or refuel, and so certain designated points may be designated as "non" finish line points or may otherwise be exempted. In other cases, the time threshold could be large, so the track is not completed unless the vehicle stops for hours, for example. In this way, a track the length of several states could even be recorded.

To accommodate tracks that end at the starting point, the process determines 215 whether or not the vehicle ever crosses back over the designated and defined starting line in the same direction of travel. This will complete a looped track, and provides a clean indicator of where a track should end.

In a third example, the process determines 217 whether or not the user has instructed a track to end. In this option, the user can manually instruct the end of a track. This may be useful in instances where the user does not want to overlap the start point (e.g., a long distance race). Any other reasonable manner of ending the track recordation is also possible.

While the track has not yet ended, the process continues to record 219 vehicle data, timing data, and location data. The location data includes a series of GPS coordinates that define the track (as a series of connected points). The track may also be defined as a tolerance around a line connecting these points, so that the track has a predefined width and accommodates the fact that GPS coordinates may often represent an area, as opposed to a point, depending on a level of precision. The vehicle data can include engine speeds, vehicle speeds and other useful vehicle data. The timing data can include the actual travel time of the vehicle, which can be useful in drawing a "ghost" vehicle in future runs.

Once the track has completed, the process creates 221 a finish line. As with the start line, while this may initially be designated by a point, the finish line can extend perpendicular to the heading at finish and/or perpendicular to a known road direction of travel. Also, as with the start line, the finish line can be user adjustable in width and length.

If the process records 223 data past the finish line (overlap in a loop type course), the process may remove 225 data backing up to the start line. In this course format, the start line and finish line may be the same line, and thus the overlap data (data after crossing the finish line) is not actually intended to be track data. In another example, the user may elect to move a finish line to another point on a recorded course, and the process can treat all data past the new point as extraneous and remove that data. The process then saves 227 the track locally, making the track available for immediate use if desired. The process can also publish 229 the track, which can include locally broadcasting the track to other local vehicles via Wi-Fi or BLUETOOTH, and/or uploading the track to a cloud server for later download by other interested parties.

Figure 3:
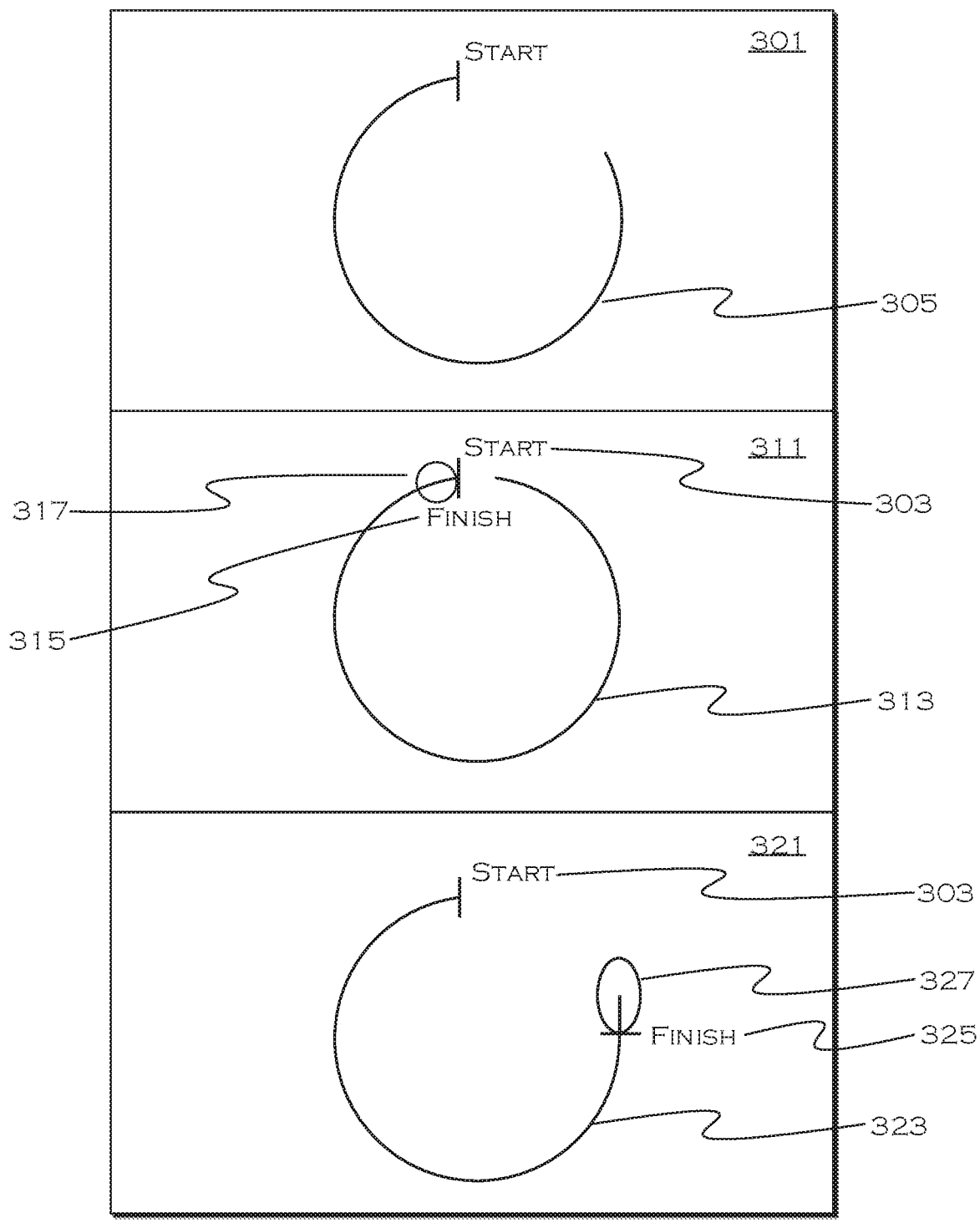
FIG. 3 shows three illustrative tracks created by a track-creation process.

FIG. 3 shows three illustrative tracks created by a track-creation process. In display 301, the process is still recording a track in progress. The track 305 begins at start point 301, and is recorded by the recordation process as the vehicle travels path 305.

In display 311, the process has completed a track 313 that began at the start point, and in this case the end of the track was registered when the vehicle crossed the starting line 303. Thus, the finish line 315 is the same as the start line 303. The process also recorded some overlap 317 when the vehicle passed the start line for the second time (completing the loop), and the process will discard this data to make a closed loop without extraneous track data.

In display 321, the process records a track 323 beginning at start line 303 and ending at user-designated finish line 325. Here, the user may have stopped the vehicle, indicating a track-end, or may have manually selected a track end. If the process recorded data 327 past the indicated stop point, or if the user manually moved the finish line backwards along the track, the process discards the extraneous post-finish line data 327.

Figure 4:
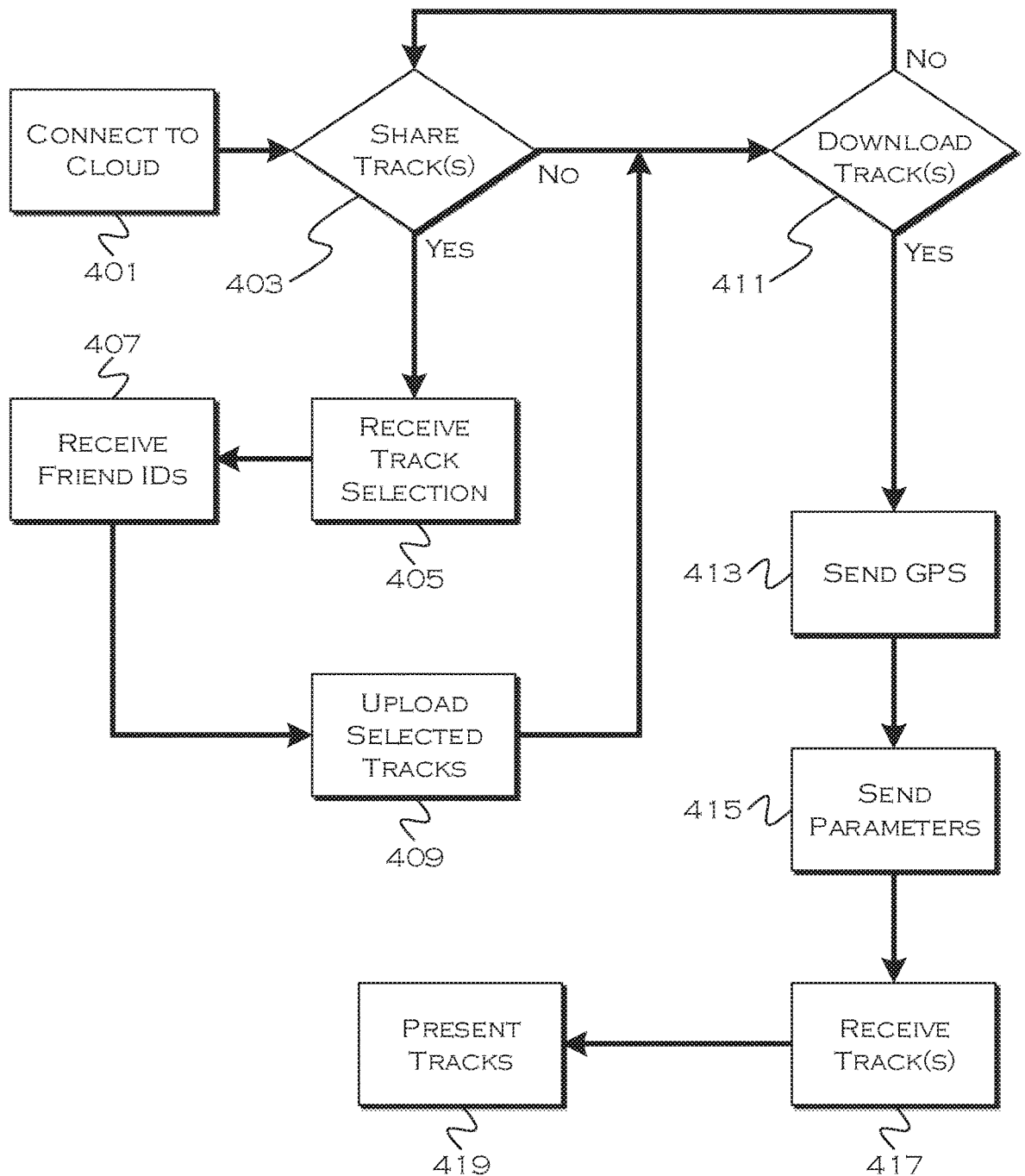
FIG. 4 shows an illustrative process for track sharing.

FIG. 4 shows an illustrative process for track sharing. In this example, the process connects to the cloud, where a repository of downloadable tracks exists. This can include, for example, user specific tracks (a personal track library) and a searchable database of tracks created by friends or just by anyone. In this example, the user is first given an option to share 403 any new or existing tracks with other parties. This can include designated parties and/or general upload of the tracks to the database for public use.

If the user elects to share a track, the process receives 405 a track selection that the user locally (in the vehicle) designated for sharing. The process may also receive 407 one or more friend identifications. These identifications can be used to store the track directly to friends' personal libraries. The process may also publish the track to a general database, making the track searchable by any interested party. The process then uploads 409 any selected tracks to the cloud library.

The user is also given an option to download 411 one or more tracks. In that case, the process may send 413 a current set of GPS coordinates, which can be used by the remote process as a search parameter. The user could also designate a particular user or other characteristic (distance, speeds, vehicle type, etc) that could be used as search parameters. The process then sends 415 any relevant search parameters to the remote server, and responsively receives 417 a list of tracks that meet the designated parameters. GPS location may be a default parameter, so the user at least receives any tracks within a predefined distance of the current GPS location. The process then presents 419 any downloaded tracks so that the user can select a track to run.

Figure 5:
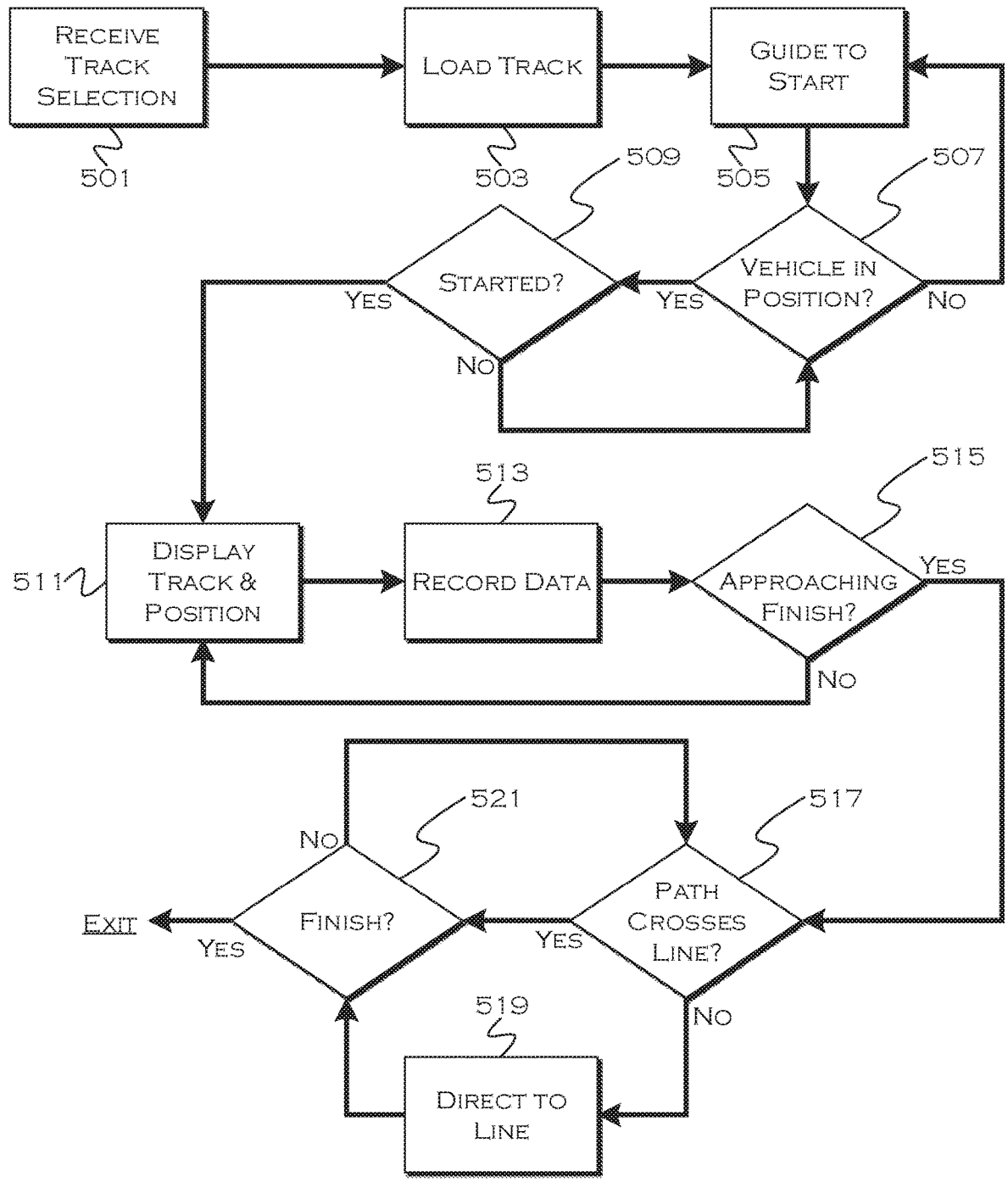
FIG. 5 shows an illustrative process for track display and utilization.

FIG. 5 shows an illustrative process for track display and utilization. In this example, the user has selected a personally created or downloaded track, or the process has preselected a track based on location or the fact that the track was just created. In another example, the user could receive an in-vehicle message, for example, including a track or link to a track, and responding to the message (such as a race invitation) would cause the track to download.

The process then loads 503 the selected track into local memory for use during a race. Since the user may not actually yet be at the start location, the process may provide 505 a set of limited directions (e.g., head north 200 ft) or even navigation instructions to the starting line. The starting line may be designated as a series of GPS points, so navigation may direct the user close to these points, and then a visual identifier on a display will represent a close up view as the user approaches the line (so the user does not cross the line). Until the vehicle is in position 507, the guidance may continue.

Once the user has started 509 the race (crossed the start line, for example), the process may display 511 a current route ahead, the full track, a snapshot of the relevant portion of track or any other reasonable view that can guide the user. This display can also include, for example, any waypoints or ghost vehicles that provide the user with additional guidance. As appropriate, the display could be done on an in-vehicle display and/or on a heads up display. If no display was present, voice data could be used to guide the user, and a voice or visual indicator (e.g., red/green LED) could indicate whether the user was behind or ahead of pace (the ghost car position).

The process records 513 the user's vehicle data, location data and timing data while the user travels, until the user reaches the finish line. If the user is approaching the finish line 515, the process may determine whether a current projected path actually crosses the finish line 517. That is, if the user maintained a current heading (or stayed on a current road), would the user successfully cross the finish line coordinates to stop the race recording and produce a time.

If the coordinates or current road cross the finish line, the process may continue recording until the user reaches the finish line 521. If the path or road deviates from a projected successful finish (i.e., if the process determines the user is likely to miss the finish line coordinates), the process can provide 519 localized directions to guide the user to the finish. This can include, for example, actual navigation directions (you must turn up ahead onto Mike Blvd in order to reach the finish line) or directional changes (please veer left as indicated to achieve the finish line). Visual guidance in the form of turns or deviance can also be provided on a vehicle display.

Figure 6:
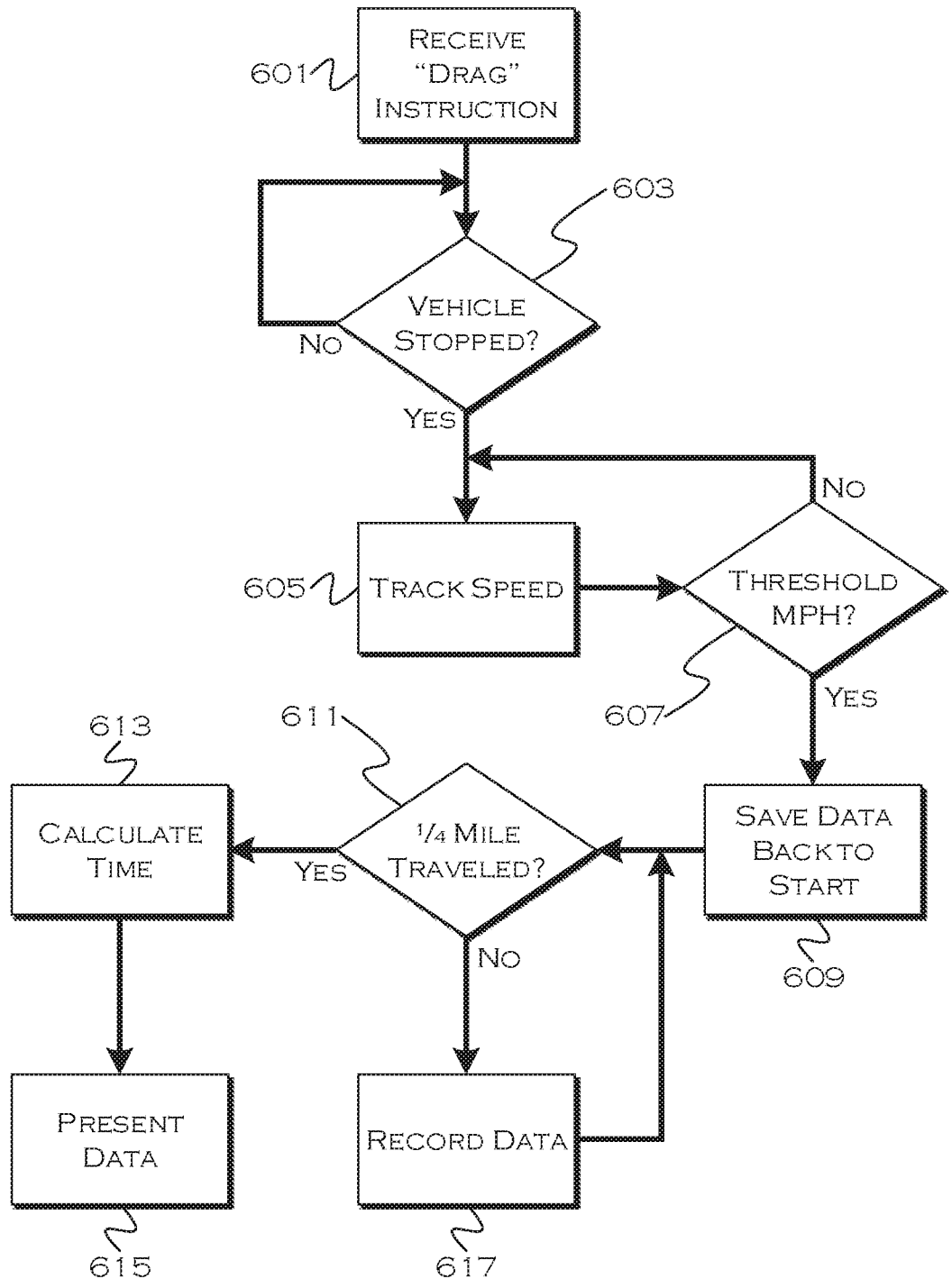
FIG. 6 shows a process for accumulating drag racing data over a fixed distance.

FIG. 6 shows a process for accumulating drag racing data over a fixed distance. In this illustrative example, the process will attempt to record a ¼ mile time, run from any location, as an equivalent to running a ¼ mile track. This is referred to here as a drag race, since drag races are typically ¼ mile races. The process also can record 0-60 mph times, 0-100 mph times, 0-200 mph times, etc., which may cause the recording to extend past the ¼ mile point.

The process receives 601 a "drag" race instruction from a user, which causes the process to enter a drag race mode. This mode will detect a vehicle full stop 603, and will attempt to use that stop as a position for a start line. Since the user may idle up to the start line or otherwise perform short distance maneuvers to appropriately position a vehicle, the process may detect a series of stops.

To accommodate short range movement before a race starts, the process tracks 605 vehicle speed and does not actually treat the race as started until the vehicle reaches a threshold speed 607. This same process could be used in the track recordation process, to avoid false start point recordation on a track if the user was simply trying to maneuver into position.

Once the user vehicle reaches a threshold speed, the process treats the previously identified last-stop (the last time the vehicle was not moving) as the start point, and saves 609 data recorded from that stop onward. For timing and distance purposes, the process will use that location as the start point.

Once the vehicle reaches 611 a distance of ¼ mile (or whatever distance the run is) from the identified start point, the process calculates 613 a race time going back to the identified start point. The process presents 615 this data to the user, as well as presenting the data to anyone else involved in the race (through transmission). Until the designated distance is reached, the process records the vehicle, location and timing data.

When performing a 0-60 mph calculation or a 0-¼ mile calculation, the process may use acceleration and velocity data to more accurately measure the time. Because the timing tracking is based on recorded data (as opposed to an outside party using a stopwatch), data points may exist at 59.7 and 60.3 mph and 0.23 miles and 0.26 miles, respectively. Neither of these data points occurs exactly at the desired time (60 mph and 0.25 miles). By using velocity and acceleration data, the process can extrapolate a predicted value at the appropriate speeds/distances. So if the process knows the time at which the vehicle hit 59.7 and 60.3, the process can use the acceleration curve and the time information to predict the time at which the vehicle hit 60 mph with reasonable accuracy.

The same is true for a ¼ mile time, if the vehicle speed and timing for 0.23 and 0.26 miles is known, the process again can use an acceleration curve and velocity data to predict the actual time at 0.25 miles.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
   a processor configured to:
   receive a track-creation request;
   initiate track recording, responsive to the request;
   record GPS points corresponding to movement of a vehicle, including creating a starting line at a GPS point where the recording began, the starting line represented by a coordinate set extending perpendicular to a heading of the vehicle or direction of travel of a road on which the vehicle is located;
   receive a track-completion instruction, indicating a cessation of track recording; and
   store the recorded GPS points, and a line connecting the points, as representing a recorded track.

2. The system of claim 1, wherein the recording begins responsive to movement of the vehicle following a detected full stop of the vehicle.

3. The system of claim 1, wherein the recording begins responsive to a speed of the vehicle being above a threshold, following a detected full stop of the vehicle.

4. The system of claim 3, wherein the recording retains all GPS points tracking back from a GPS point where the vehicle reached the speed to a point where the full stop occurred.

5. The system of claim 1, wherein the track-completion instruction occurs automatically when the vehicle crosses the starting line.

6. The system of claim 1, wherein the track-completion instruction occurs automatically when the vehicle has ceased movement for more than a predetermine period of time.

7. The system of claim 1, wherein the track-completion instruction is a user-input instruction to end recording.

8. The system of claim 1, wherein the processor is configured to record and store performance data of the vehicle as the vehicle travels the recorded track.

9. The system of claim 8, wherein the processor is configured to store the vehicle performance data with respect to each of the recorded GPS coordinates, the performance data stored with respect to a given coordinate indicative of vehicle performance at that particular coordinate.

10. The system of claim 1, wherein the starting line has a width and a length.

11. The system of claim 10, wherein the width is manually adjustable.

12. The system of claim 10, wherein the length is manually adjustable.

13. The system of claim 10, wherein the width and the length are manually adjustable.

14. The system of claim 5, wherein the track-completion instruction occurs automatically when the vehicle crosses the starting line in a same direction of travel as the vehicle was headed when the starting line was created.

* * * * *